(12) United States Patent
Bloom et al.

(10) Patent No.: US 7,813,992 B2
(45) Date of Patent: *Oct. 12, 2010

(54) BALANCING ARBITRAGABLE TRACKING SECURITIES

(75) Inventors: Steven M. Bloom, Springfield, NJ (US);
Michael S. Spector, Washington, DC (US); John L. Jacobs, Columbia, MD (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1644 days.

This patent is subject to a terminal disclaimer.

(21) Appl. No.: 10/001,900

(22) Filed: Nov. 14, 2001

(65) Prior Publication Data

US 2003/0093349 A1 May 15, 2003

(51) Int. Cl.
*G06Q 40/00* (2006.01)
(52) U.S. Cl. ........................................ 705/37
(58) Field of Classification Search ............... 705/37
See application file for complete search history.

(56) References Cited

U.S. PATENT DOCUMENTS

| | | | |
|---|---|---|---|
| 6,035,287 A * | 3/2000 | Stallaert et al. ............... 705/37 |
| 6,278,983 B1 | 8/2001 | Ball |
| 6,879,964 B2 * | 4/2005 | Sauter et al. .................. 705/37 |
| 6,941,280 B1 * | 9/2005 | Gastineau et al. ......... 705/36 R |
| 6,947,901 B1 * | 9/2005 | McCabe et al. ............... 705/26 |
| 7,062,459 B1 * | 6/2006 | Herbst et al. .................. 705/37 |
| 7,080,050 B1 * | 7/2006 | Himmelstein ................ 705/80 |
| 7,099,838 B1 * | 8/2006 | Gastineau et al. ............. 705/35 |
| 7,124,106 B1 * | 10/2006 | Stallaert et al. ............... 705/37 |
| 7,133,847 B2 * | 11/2006 | Himmelstein ................ 705/80 |
| 7,249,086 B2 | 7/2007 | Bloom et al. |
| 2001/0025266 A1 * | 9/2001 | Gastineau et al. ............. 705/36 |
| 2002/0004759 A1 * | 1/2002 | Bradford et al. .............. 705/26 |
| 2002/0091616 A1 * | 7/2002 | Bloom et al. ................. 705/37 |
| 2002/0128947 A1 * | 9/2002 | Sauter et al. .................. 705/37 |
| 2002/0184126 A1 * | 12/2002 | McIntyre et al. .............. 705/35 |

FOREIGN PATENT DOCUMENTS

WO     WO01/72106     10/2001

OTHER PUBLICATIONS

Critics Worry about risks of Exchange-Traded Funds, Wall Street Journal; New York, NY; Jul. 7, 2000; by Karen Damato and Aaron Lucchetti.*

(Continued)

*Primary Examiner*—Jagdish N Patel
*Assistant Examiner*—Sara Chandler
(74) *Attorney, Agent, or Firm*—Fish & Richardson P.C.

(57) ABSTRACT

A financial product is based on a first fund that is traded on a trading marketplace in a first country. The financial product is registered in the first country. The first fund has the characteristics of being based on an index of securities that are traded in a second, different country. The first fund is arbitragable with a second fund that is based on the index and which is registered in a second different country. The first fund has a creation unit basis that is substantially the same basis as a creation unit basis for the second fund. The calculation of the net asset value of the first fund occurs at essentially or exactly the same time that second country fund has its NAV calculated.

22 Claims, 4 Drawing Sheets

OTHER PUBLICATIONS

"Exchange-traded funds not for everyone," by Wilfred L Dellva. Journal of Financial Planning. Denver: Apr. 2001. vol. 14, Iss. 4.*

Gastineau, US Pub. No. 2001/0025266 in view of "Exchange traded funds—the wave of the future ?," by Stuart M. Strauss. The Investment Lawyer. Englewood Cliffs: Apr. 2000. vol. 7, Iss. 4.*

"Exchange-Traded Funds: An Introduction," by Gary L. Gastineau. Journal of Portfolio Management; Spring 2001; 27, 3; ABI/INFORM Global. pp. 88-96.*

"WEBS Surpass $1 Billion" Business Editors. Business Wire. New York: Jan. 11, 1999 (via Proquest, pp. 1-3).*

"Actively-Managed Exchange Traded Funds: Coming Soon to a Market Near You?," by Anthony Ragozino and Charlie J. Gambino. The Investment Lawyer; May 2001; 8,5; ABI/INFORM Global. pp. 3-9.*

"The effect of country-specific index trading on closed-end country funds: an empirical analysis," by Mathew O'Conner and Edward A. Down. Financial Services Review 9 (2000). pp. 259-275.*

"Arbitrage and Valuation in the Market for Standard and Poor's Depositary Receipts," by Lucy F. Ackert and Yisong S. Tian. Financial Management; Autumn 2000; 29,3; ABI/INFORM Global. p. 71.*

Olienyk et al., "Using World Equity Benchmark Shares to Achieve International Diversification," Journal of Financial Planning, v13n6, pp. 98-113, Jun. 2000.

"iShares, Inc. Announces Results of Special Shareholders' Meetings", Business Wire, Jul. 3, 2000.

"iShares, Inc. Announces Estimated Tax Characteristics of Aug. 31, 2000 Distributions", Business Wire, 2512, Sep. 7, 2000.

"iShares, Inc. Announces Launch of Its New EMU Fund and 'Non-Diversified' Classification of the EMU Fund", Business Wire, 2703, Jul. 27, 2000.

"Barclays Global Investors Continues Expansion of the Largest Worldwide Marketplace of Exchange Traded Funds; New iShares for all of Europe in one investment", Business Wire, 2322, Jul. 27, 2000.

"Barclays Global Investors Begins Expansion of Exchange Traded Fund Offering; iShares Provide the Best of Stocks and Index Funds in One Investment", Business Wire, May 18, 2000.

"Barclays Global Investors Launches New Exchange Trded Fund Tracking Taiwan; iShares MSCI Taiwan is $19^{th}$ MSCI Country Managed by BGI", Business Wire, 0162, Jun. 22, 2000.

Malkiel, Burton, G., "Investors Shouldn't Fear 'Spiders'—Exchange-traded funds have some unique advantages and deserve a respected place in the menu of index products." The Asian Wall Street Journal: New York: Jun. 5, 2000, p. 8 (full text) ProQuest (online) (retrieved Aug. 16, 2002).

Damato, Karen, and Lucchetti, Aaron, "Critics Worry About Risks of Exchange-Traded Funds", The Wall Street Journal; New York; Jul. 7, 2000, p. C1 (full text) ProQuest (online) (retrieved Aug. 16, 2002).

Deliva. Wilfred L. "Exchange-traded funds not for everyone", Journal of Financial Planning, Denver, Apr. 2001, vol. 14, Iss. 4.

Strauss, Stuart M., "Exchange traded funds—the wave of the future?", The Investment Lawyer, Englewood Cliffs, Apr. 2000, vol. 7, Iss. 4.

Nasdaq 100 Trust Series 1 Prospectus Jun. 30, 2000.

International Search Report for PCT/US2002/035233 Mailed Sep. 9, 2003.

* cited by examiner

BALANCING ARBITRAGABLE TRACKING SECURITIES

BACKGROUND

This invention relates to balancing values associated with arbitragable trading tracking stocks and the like. Exchange traded fund shares including various forms of index tracking stocks exist that are based on indexes such as the Nasdaq-100 Index®. The Nasdaq-100 Index Tracking Stock$^{SM}$ is traded in the United States under the ticker symbol QQQ. The Nasdaq-100 Index Tracking Stock$^{SM}$ is registered as a U.S. investment company.

SUMMARY

According to an aspect of the present invention, a method of producing shares of a first fund that is traded on a first marketplace includes delivering by a market participant to an agent for the first fund, a creation unit basket of securities having a basis that is substantially the same basis as a creation unit basis for a second fund that is traded on a second marketplace in a different country than that of the first fund and delivering a prescribed number of shares in the first fund to the market participant, in exchange for the creation unit basket of securities and a second, number of shares in the second fund to account for cash that is owed by the agent to the participant.

According to an additional aspect of the present invention, a computer program product resides on a computer readable medium. The product administers a financial product that has shares which are traded in a first marketplace. The product is based on a creation unit basket of securities having a basis that is substantially the same basis as the creation unit basis for a second financial product that is traded on a second marketplace in a different country. The computer program product includes instructions for causing a processor to determine a second, number of shares in the second fund to account for cash that is owed by the agent to the participant to allow the agent to deliver second, number of shares in the second fund in lieu of the cash and a prescribed number of shares in the first fund to the market participant in exchange for the creation unit basket.

According to an additional aspect of the invention, a system, includes a computer and a storage medium storing a computer program product for administrating a financial product that has shares which are traded in a first marketplace the product based on a creation unit basket of securities having a basis that is substantially the same basis as the creation unit basis for a second financial product that is traded on a second marketplace in a different country. The computer program product comprises instructions for causing a processor to determine a second, number of shares in the second fund to account for cash that is owed by the agent to the participant to allow the agent to deliver second, number of shares in the second fund in lieu of the cash and a prescribed number of shares in the first fund to the market participant in exchange for the creation unit basket One or more of the following advantages may be provided by one or more aspects of the invention.

The invention provides a mechanism to balance expenses or other cost associated with non fungible, yet arbitragable shares of exchange-traded funds that follow a common investment objective of tracking an index in one country, but are registered in different countries. For example, an investment fund in a European country can track the Nasdaq-100 Index®. The investment fund is registered as a fund in the first country, but is based on an index of stocks in the second country. Because of the different registrations and expenses associated with the different funds, the Net Asset Values of the funds over time e.g., a year or several years can become skewed.

An authorized agent issues shares in the first country fund by accepting delivery of a creation unit basket of stocks received from a market participant plus or minus a cash amount. The cash amount is determined each day, so that the closing value of the basket plus or minus the cash amount equates to the net asset value of the equivalent number of second fund shares when the net asset value is calculated at the close of trading in the second country.

If costs and fees associated with the first fund exceeds those of the second fund, it is likely that when an authorized agent delivers the first fund shares in exchange for the creation unit basket, the agent might also need to deliver cash, which will become an every increasing amount over time to compensate for differences in the net asset value (NAV) of the first country fund and second country fund. This is not desirable for several reasons. For example, this minimizes the opportunity to arbitrage between the two funds. By allowing the agent to deliver an equivalent number of shares of the second country fund along with the shares of the first country fund, this mechanism eliminates the need for large cash exchange and makes the two funds more perfectly arbitragable.

DESCRIPTION

Figure 1:
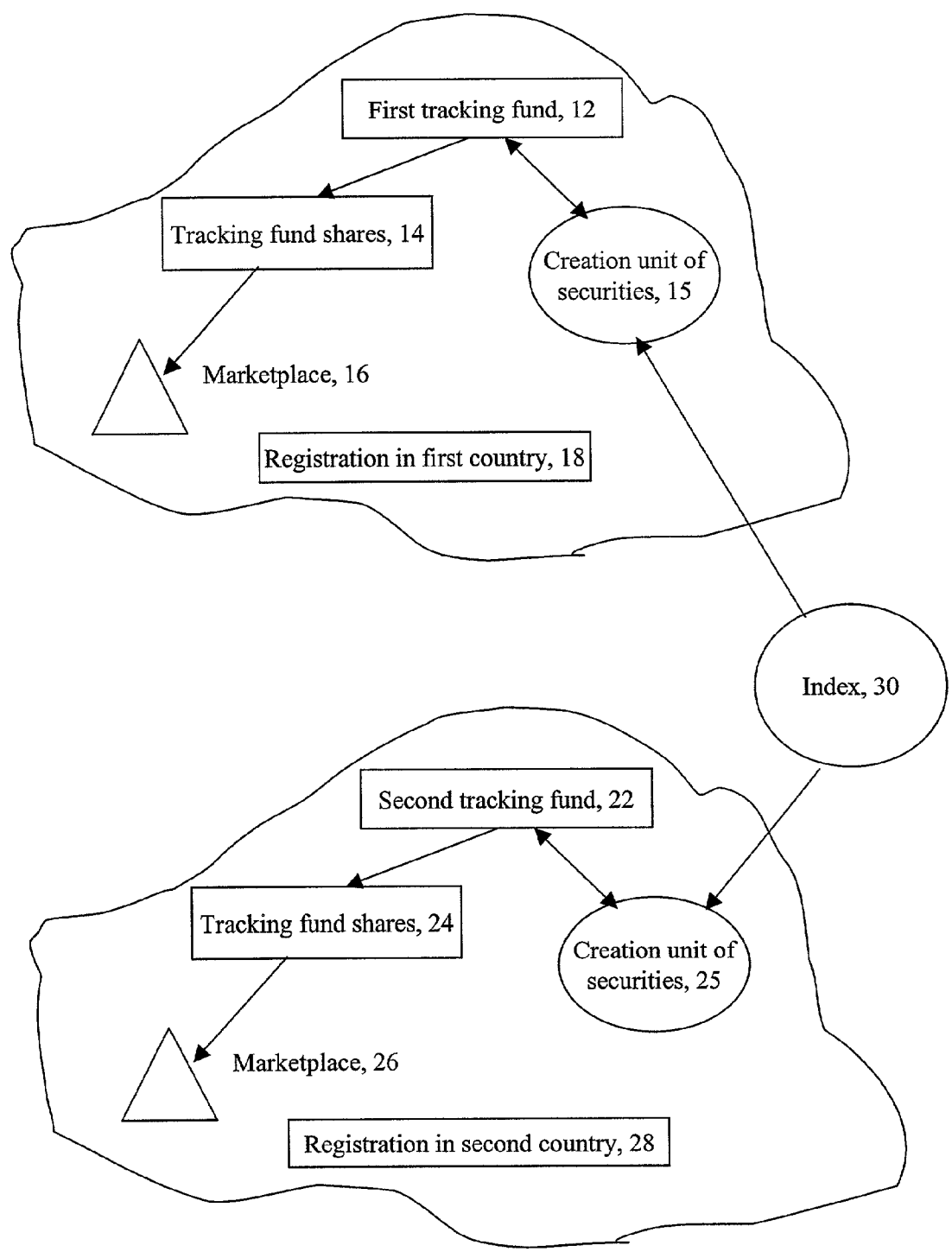
FIG. 1 is a block diagram depicting two investment vehicles that are registered in different countries.

Referring to FIG. 1, a first index-tracking fund 12 issues tracking fund shares 14 that are traded on a marketplace 16 in a first country 18. In addition or as an alternative to being traded on a marketplace, the first index-tracking fund 12 can be traded on an over-the-counter marketplace or through the facilities of an electronic communications network (ECN) or other securities trading marketplace. The first tracking fund 12 has a different country of registration 18 than that of a second fund 22. The second fund 22 also issues tracking fund shares 24 traded on a second marketplace 26. The second marketplace 26 is based in a second country 28. Also trading of the second fund can alternatively occur on an over-the-counter marketplace or through an ECN or other securities trading marketplace.

Both the first tracking fund 12 and the second tracking fund 22 each track a common index 30. One example of an index that the first and second tracking funds could track is the Nasdaq-100 Index®. Other examples could include the S&P 500® Index or any other well-known or not so well-known index. Requirements of an index-tracking fund are to track or outperform the price and yield performance of a target index.

Depending on the laws or regulations in various countries, the first index tracking fund 12 can be traded in marketplaces in the first country 18 or in marketplaces in other countries, other than marketplaces in the second country 28. Therefore, the first tracking fund shares 14, which are shares of ownership of the first index tracking fund 12, are not fungible with tracking fund shares 24 of the second fund 22. By being nonfungible is meant that an investor could not buy the shares of the first tracking fund 12 and sell the shares of the first tracking fund on the second marketplace 26 in the second country 28 or vice-a-versa. The first and second tracking funds 12, 22 are not fungible at the share level 22, 24.

The first tracking fund 12, however, is designed to permit arbitrage of the first tracking fund 12 with respect to the second tracking fund 22 to be as seamless, convenient, and inexpensive, as possible, in order to promote maximum liquidity of both the first and the second tracking funds 12, 22.

The first tracking fund 12 and the second tracking fund 22 are each based on creation units 15, 25 respectively. To make the first tracking fund 12 arbitragable with the second tracking fund 22, the first tracking fund 12 uses a creation unit 15 basis that is substantially the same as, and preferably essentially identical to, the creation unit 25 basis for the second tracking fund 22. Creation units are specific to exchange traded funds and are known, such as for the Standard & Poor's Depositary Receipts® (SPDRs).

The creation unit is a specific basket of stocks having a specific quantity of shares for each stock in the basket. The creation unit represents a delivery of a basket of such stocks by an authorized participant to an agent. In exchange for the delivery of that basket of stocks (plus or minus a cash amount as determined daily), the agent, e.g., a bank, trustee and so forth, receives the delivery, and issues a block of shares in the fund. As a preferred option, the agent can transfer an equivalent amount of shares of the second country fund in lieu of cash, as will be described in conjunction with FIG. 3. The block of shares corresponds to, e.g., 50,000 shares for each creation unit of stock delivered. Suppose, in this example, one creation unit of stock equates to 50,000 shares of both the second fund 22 or the first fund 12. The number of fund shares that are provided from a creation unit is sometimes referred to as a "bursting" factor. Other share aggregation sizes of creation units are possible. For example, it is not necessary that the bursting factor (e.g., number of shares attributed to a creation unit) be the same for the first fund 12 and the second fund 22. Rather, the bursting factor of each fund need only be a defined numerical relationship in order to be used to set a ratio for arbitrage between the two tracking fund shares.

The composition of the creation unit is based on the index 30 and can be adjusted for various reasons as determined by an agent such as an index receipt agent, trustee, administrator, or other entity designated to perform that function. That composition can change if a stock is added to or deleted from the index 30 or if a weight change occurs in the index, and so forth. The composition of the creation unit changes because at all times the agent is seeking to define the creation unit package in such a way that it reflects the index 30.

The first fund 12 is set up so that the first tracking fund 12 also has one creation unit equal to 50,000 shares of the first fund 12. That is, the share aggregation size of the creation units 15 and 25 are respectively equal for first fund 12 and the second fund 22. Other arrangements are possible. All that is required is that there exist a known numerical relationship or ratio between the bursting factor of the first tracking fund 12 and the bursting factor of the second tracking fund 22. The identity of the stocks and the weights of the stocks in the first country 18 creation unit 15 equals those in the second country 28 creation unit 25. The first fund 12 thus also seeks to track the index 30. In setting up the first fund 12, the creation unit 15 is defined to rely upon the composition underlying the creation unit 25 for the second fund 22.

Figure 2:
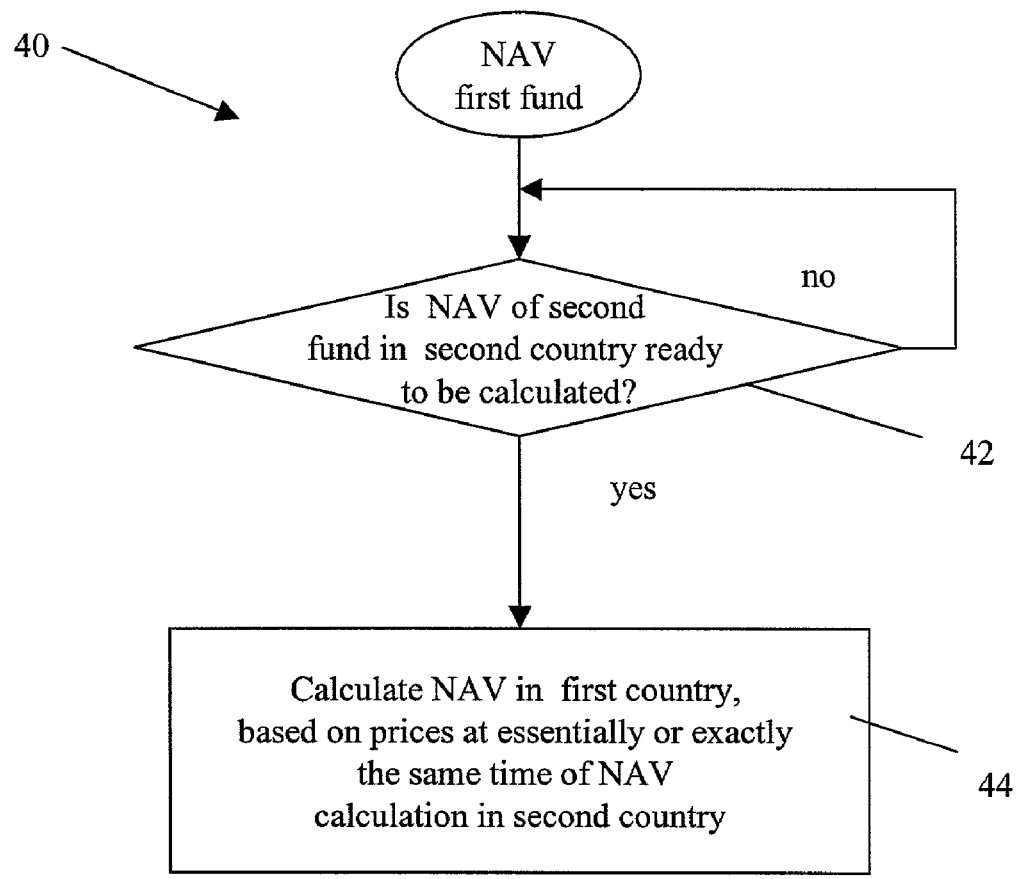
FIG. 2 is a flow chart depicting timing of net asset value calculations for arbitragable funds.

Referring to FIG. 2, mutual funds and the like, under various jurisdictions, e.g., the Investment Company Act of 1940 for the U.S., calculate a net asset value 44 periodically, e.g., at least once daily. This price is used to redeem and create shares in mutual funds or as above tracking funds. Ordinarily this calculation is performed at the end of each trading day in the country where the fund is traded based on the composition of the fund. For U.S. funds, calculation is performed under provisions of the Investment Company Act of 1940 and subject to applicable rules and guidelines promulgated by the Securities and Exchange Commission (SEC). Essentially, the NAV calculation 44 is performed on a daily basis using closing prices in the regular trading sessions of The Nasdaq Stock Market, The New York Stock Exchange, or The American Stock Exchange, depending on where the security is listed. The calculation is based on pricing at or about 4:00 p.m. each day, New York time. Thus, the second fund 22 has its NAV calculated 44 based upon closing prices each day which is more or less around 4:00 p.m., New York time.

For the first tracking fund 12, rather than having an NAV calculation performed 16 during or just after trading of the first tracking fund 12 in the country where the first fund 12 is trading, the NAV calculation process 40 for the first fund is programmed with or is determined 42 when the NAV is ready to be calculated for the second tracking fund 22. This calculation is generally performed after the close of trading for the second tracking fund 22 in the second country 24. Thus, at such time that is customary for NAV calculations for the second tracking fund, the NAV is also calculated 44 for the first tracking fund. This approach deviates from a typical practice for a tracking fund in the first country. Normally, the NAV for a fund is calculated at the end of trading in the country of registration and is not synchronized to a calculation in a different country of registration in a different time zone. One of the advantages of calculating the NAV of the first tracking fund 12 at essentially or exactly the same time as calculating the NAV of the second tracking fund 22 is that together with the equal or numerically related creation units, an arbitrager can trade in the shares of one fund using as a reference the prices or expected prices of the shares of the second fund.

Another benefit occurs in the first country where the first tracking fund 12 is trading. If first tracking shares 14 of the first tracking fund 12 are trading at a sufficient premium in relation to what would objectively be calculated as fair value, the first fund shares 14 are trading at a higher price, and in that case there is an opportunity for arbitrage.

An arbitrager could sell 50,000 first fund shares 14 in the first or another country 18 where the shares are trading at a sufficient premium, and could buy at the soonest opportunity on the second marketplace 50,000 second fund shares 24. The arbitrager could sell at the high price and buy at a relatively lower price. When the arbitrager buys the 50,000 second fund shares 24, the arbitrager will redeem the second fund shares 24 for the stock (plus or minus a cash amount tied to the next calculated NAV of the second fund) and deliver that stock (plus or minus a cash amount tied to the next calculated NAV of the first fund) to the first fund issuer. The delivery served as the basis of issuance for 50,000 first country shares to cover the shares that the arbitrager had initially sold. The profit is the difference between the sale proceeds of the first country shares and the cost of the purchase of second country shares less transaction costs and plus or minus the difference in associated cash amounts.

The situation where the first country shares are sufficiently undervalued in relation to an objective measurement of fair value works in a similar but opposite way. The arbitrager could buy 50,000 first fund 12 shares in the first country 18 or other countries, and sell 50,000 second fund 22 shares at the soonest opportunity of trading in the second country 28. When the arbitrager buys the 50,000 first fund 12 shares in the first or other countries 18, the arbitrager could redeem those fund shares for stock (plus or minus a cash amount as referred to above). The arbitrager could arrange to deliver the stock to the second country agent, bank, trustee, etc., plus or minus the applicable cash amount, and request production of a creation unit of second fund shares to satisfy the delivery obligation of the second fund 22 shares, which were sold on the second country 28 marketplace. The profit is measured as the proceeds from the sale of second fund 22 shares on the second country 28 marketplace versus the cost of the purchase of the 50,000 first fund 12 shares in the first or other countries 18, less any transaction cost and plus or minus the difference in associated cash amounts.

The timing when the NAV calculation is performed enhances arbitrage between the two different funds. When a creation unit for such types of funds is produced, the producer delivers to the agent not only the stock composition, but also an additional amount, plus or minus, of cash or if during a redemption, the redeemer is paid an additional amount of cash (plus or minus) so that the closing value of the stock basket plus or minus the cash owed to the agent or paid by the agent equals on a creation unit basis the next calculated net asset value for 50,000 second or first fund shares.

In the United States, under the Investment Company Act of 1940, when an investor comes in or out of an investment company, the investor must come in or out at the next calculated net asset value for the investment company. In effect, the creation of 50,000 second fund shares 24 is effected through the delivery of a basket of stocks in the creation unit of the second fund 22, plus or minus a cash amount. The cash amount is determined each day so that the closing value of the basket plus or minus the cash amount equates to the net asset value of 50,000 second fund 22 shares when the net asset value is calculated at the close of trading in the second country 21.

If an investor were not required to come in or out of the fund at the net asset value, then an investor could receive 50,000 newly issued second fund shares and might pay less than the net asset value associated with the previously issued shares, which would dilute the value of the fund. This requirement that an investor come in or out of the fund at the closing NAV under the Investment Company Act of 1940 protects shareholder value. The NAV is calculated for the second fund 22 at the closing market value of the underlying index in the second country.

The first fund 12, which is registered and/or traded in the first or other countries 18 other than the second country 28 is also designed such that the 50,000 shares (plus or minus cash to the agent) equates to the net asset value for the 50,000 first fund shares. To accomplish this the first fund calculates the net asset value of the first fund 12 at substantially the same time and preferably exactly the same time, as the NAV of the second fund 22 is calculated, to eliminate to the extent possible any difference in the cash amount.

Some funds in some countries, e.g., the United States, require redemption or creation of the fund shares, primarily as in-kind creation redemption only. In other words, in such funds in these countries there cannot be a cash purchase with the fund or a cash redemption. The laws or regulations in the first country 18 or other countries may be different. For example, the laws of the first country 18 may provide for in-kind purchases/redemptions and/or permit cash purchases/redemptions.

A cash purchase or redemption can be subject to a minimum subscription amount, e.g., 100,000 dollars U.S., whereas the creation unit for second country shares could be established at a much higher amount, e.g., 5 million dollars U.S. In other words, a partial creation unit can be purchased or redeemed by delivering or accepting $100,000 cash rather than dealing in-kind with the actual stocks associated with a full creation unit.

The combination of these attributes of the design of the first fund product 12 permit maximum arbitrage possibilities between the first fund product 12 and the second fund product 22. This occurs even though the first fund product 12 and the second fund product 22 are separate registrations and ordinarily are not fungible at the share level, and therefore are not readily arbitragable. Thus, by setting the creation unit of the first fund 12 to be equal to or have a fixed numerical relationship or ratio to the creation unit of the second fund (the primary market creation unit), and/or by calculating the NAV for the first fund at the same time as the second fund primary market enables the first fund 12 to be highly arbitragable with the second fund. The second country is not only the primary market for the second fund, but is also the primary market for the underlying securities in the index upon which the first fund 12 and the second fund 22 are based.

These features of fixed relationship creation units and simultaneous NAV calculations enable direct arbitrage of otherwise unlike, i.e., nonfungible, securities. The features provide a mechanism for the exportation or importation of any exchange traded fund from one country out of or into any other country.

Figure 3:
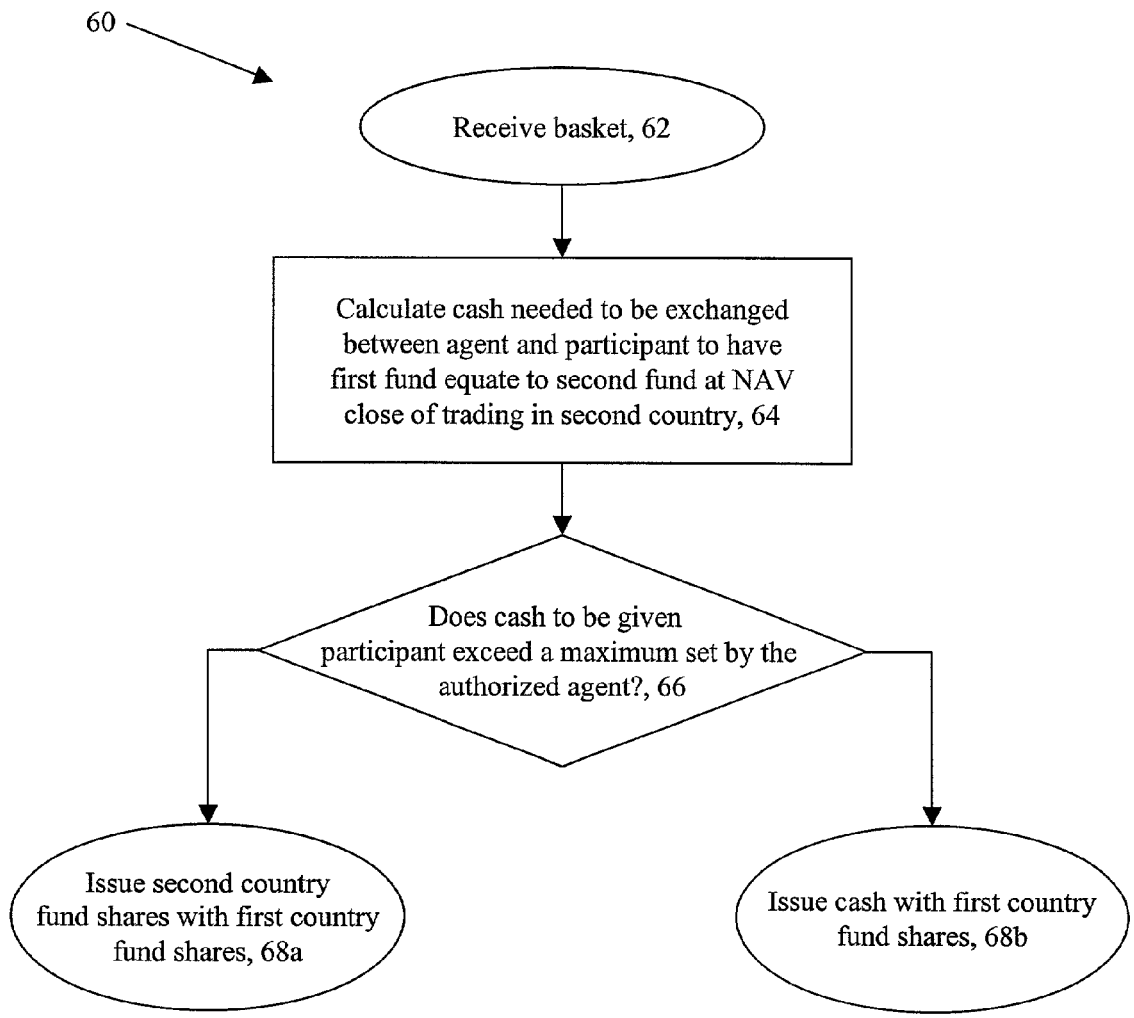
FIG. 3 is a flow chart that depicts a process to balance values between first and second funds at time of creation of first fund shares.

Referring to FIG. 3, an agent receives 62 from a market participant a basket of securities, as described above. The agent exchanges the basket of securities for a prescribed number of shares in the first fund. As part of the exchange, the agent calculates 64 the amount of cash needed to be exchanged between agent and the participant to have first fund equate to second fund at the NAV at the close of trading in the second country.

If the cash is a positive amount the agent owes cash to the participant. As shown in FIG. 3, if the calculation 64 indicates that the agent that issues the shares must also issue cash to the market participant 66, the agent at its option can instead issue 68a shares in the second country fund along with the shares in the first country fund. A small amount of cash may be required to be exchange in either direction to make sure that the first country shares, second country shares and the plus/minus cash amount equates to the net asset value for the 50,000 first fund shares. The agent can set a maximum cash amount that it will give to participants. Any transactions that exceed the maximum amount will result in issuance of the second country fund shares along with the prescribed amount of first country shares, e.g., 50,000 in this example. If this option is not exercised, then the agent can simple issue 68b cash to the participant along with the shares of the first country fund.

Figure 4:
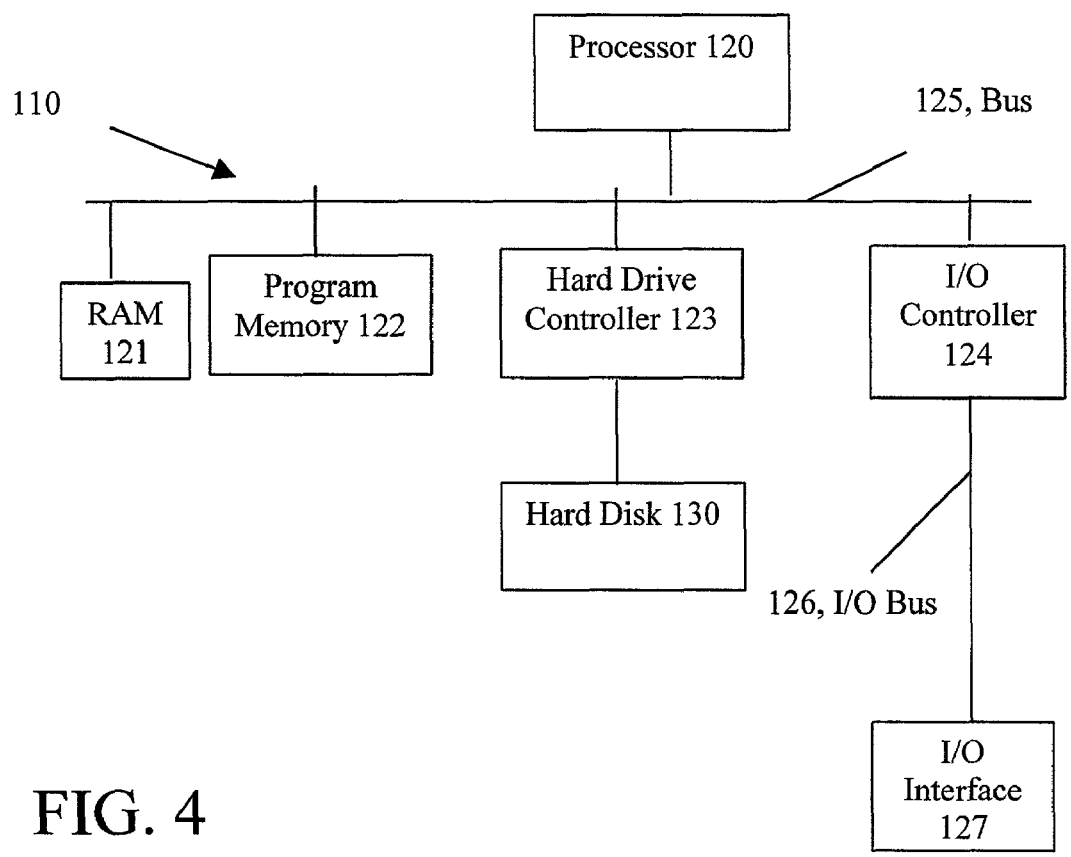
FIG. 4 is a block diagram of a computer system.

The invention can be implemented in digital electronic circuitry, or in computer hardware, firmware, software, or in combinations thereof. Additionally, aspects of the invention can be implemented manually. For example, the calculations of the NAV for the first fund and the second fund can occur in systems 110 as shown in FIG. 4. Also aspects of the calculations of whether to dispense cash or fund shares in receipt of a basket of securities can occur in systems as in FIG. 4. Generation of creation units can be implemented using any technique commonly employed for such funds taking into consideration the option of the agent to issue second country fund shares in lieu of cash. Also, data structures can be used to represent the first fund shares. These data structures (not shown) can be stored in memory and in persistence storage.

The first fund shares can be represented by certificates or as book entries in the records of an administrator or broker/dealer either as manual or computer entries.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

An example of one such type of computer is shown in FIG. 4, which shows a block diagram of a programmable processing system (system) 110 suitable for implementing or performing the apparatus or methods of the invention. The system 110 includes a processor 120, a random access memory (RAM) 121, a program memory 122 (for example, a writeable read-only memory (ROM) such as a flash ROM), a hard drive controller 123, and an input/output (I/O) controller 124 coupled by a processor (CPU) bus 125. The system 110 can be preprogrammed, in ROM, for example, or it can be programmed (and reprogrammed) by loading a program from another source (for example, from a floppy disk, a CD-ROM, or another computer).

The hard drive controller 123 is coupled to a hard disk 130 suitable for storing executable computer programs, including programs embodying the present invention, and data including storage. The I/O controller 124 is coupled by an I/O bus 126 to an I/O interface 127. The I/O interface 127 receives and transmits data in analog or digital form over communication links such as a serial link, local area network, wireless link, and parallel link.

Other embodiments are within the scope of the appended claims. For example, an arbitrager will redeem the second fund shares for the stock (plus or minus a cash amount tied to the next calculated NAV of the second fund). Optionally, in situations where the arbitrager owes cash to the agent, the arbitrager can deliver the tracking stocks (plus the first fund shares in lieu of the cash amount tied to the next calculated NAV of the first fund. In some embodiments, this mechanism can be used by a participant when the participant seeks to minimize cash and could convey the second fund shares and the basket of securities to the agent in exchange for the first fund shares.

What is claimed is:

1. A method of producing shares of a first fund, which are traded on a first marketplace, the method executed on a computer, the method comprising:
    recording by the computer, delivery by a market participant to an agent for the first fund, of a creation unit basket of securities having a creation unit basis that is substantially the same as a creation unit basis for a second fund that is traded on a second marketplace in a second, different country than that of the first fund; and
    recording by the computer, delivery of a prescribed number of shares in the first fund to the market participant, in exchange for the creation unit basket of securities and a second number of shares in the second fund to account for cash that is owed by the agent to the participant.

2. The method of claim 1 further comprising:
    calculating by the computer system an amount of cash needed to be exchanged between agent and the participant to have the first fund equate to the second fund at the net asset value of the second fund at the close of trading of the second fund in the second country;
    wherein if the cash needed to be exchanged is owed by the agent to the participant that cash is settled in the second number of shares in the second fund.

3. The method of claim 2 wherein the amount of cash equates the value of the first fund shares to the value of the second fund shares.

4. The method of claim 2 wherein the agent sets a maximum cash amount that it will give to participants.

5. The method of claim 4 wherein when the maximum cash amount is exceeded, the exceeding of the maximum cash amount will result in issuance of the second fund shares along with the prescribed number of first fund shares.

6. A computer program product residing on a computer readable medium, for administrating a first financial product that has shares traded in a first marketplace the first financial product based on a creation unit basket of securities having a basis that is substantially the same basis as a creation unit basis for a second financial product that has shares traded on a second marketplace in a different country, the computer program product comprising instructions for causing a processor to:
    determine a second number of shares in the second financial product to account for cash that is owed by an agent that issues the shares in the first financial product to a participant that receives the shares in the first financial product, the agent delivering a second number of shares in the second financial product in lieu of the cash.

7. The computer program product of claim 6 further comprising instructions to:
    calculate the amount of cash needed to be exchanged between agent and the participant to have the first financial product shares equate to the second fund shares at the net asset value of the second financial product shares at the close of trading of the second fund shares in the second country;
    wherein if the cash needed to be exchanged is owed by the agent to the participant that cash is settled in the second number of shares in the second fund.

8. The computer program product of claim 7 wherein the amount of cash exchanged from the agent to the market participant or from market participant to the agent equates the value of the first financial product shares to the value of the second financial product shares.

9. The computer program product of claim 7 wherein when the program calculates that a maximum cash amount is exceeded, the exceeding of the maximum amount will result in issuance of the second financial product shares along with the number of first financial product shares.

10. The computer program product of claim 6 further comprising instructions to:
determine a prescribed number of shares in the first financial product provided to the participant in exchange for the creation unit basket.

11. A system, comprises:
a computer; and
a storage medium storing a computer program product for administrating a first financial product that has shares traded in a first marketplace, the first financial product based on a creation unit basket of securities having a basis that is substantially the same basis as the creation unit basis for a second financial product that has shares traded on a second marketplace in a different country, the computer program product comprising instructions for causing a processor to:
record the number of shares issued in the first financial product; and
determine a second number of shares in the second financial product to account for cash that is owed by an agent that issues the shares in the first financial product to a participant that receives the shares, the agent delivering the second, number of shares in the second financial product in lieu of the cash; and
record the second number of shares delivered in the second financial product.

12. The system of claim 11 wherein the computer program product further comprising instructions to:
calculate the amount of cash to exchange between the agent and the participant to have first financial product shares equate to the second financial product shares at the net asset value at the close of trading in second country to determine the cash amount owed;
wherein if the cash needed to be exchanged is owed by the agent to the participant that cash is settled in the second number of shares in the second fund.

13. The system of claim 11 wherein the computer program product determines the amount of cash exchanged to equates values of the first financial product shares to values of the second financial product shares.

14. The system of claim 11 wherein the computer program product calculates whether transactions exceed a maximum amount will result in issuance of the second financial product shares along with the number of first financial product shares.

15. A computer program product residing on a computer readable medium, for administrating a first exchange-traded fund, the computer program product comprising instructions for causing a processor to:
record creation of the first exchange-traded fund, the first exchange-traded fund having a prescribed number of shares for trading in a first country, the first exchange-traded fund produced by delivery to an agent, in exchange for the prescribed number of shares of a creation unit basket of securities having a basis that is substantially the same basis as a creation unit basis for a second exchange-traded fund that has shares traded on a second marketplace in a second, different country;
determine a number of shares in the second exchange-traded fund to account for cash that is owed by the agent to the participant the agent delivering the second number of shares in the second exchange-traded fund in lieu of the cash; and
record the prescribed number of shares in the first exchange-traded fund and the number of shares in the second exchange-traded fund to account for the cash.

16. The computer program product of claim 15 further comprising instructions to:
calculate the amount of cash needed to be exchanged between the agent and the participant to have first exchange-traded fund equate to second exchange-traded fund at the net asset value at the close of trading of the second exchange-traded fund in the second country;
wherein if the cash needed to be exchanged is owed by the agent to the participant that cash is settled in the second number of shares in the second fund.

17. The computer program product of claim 16 wherein the amount of cash exchanged from the agent to the market participant or from market participant to the agent equates the value of the first exchange-traded fund to the value of the second exchange-traded fund.

18. The computer program product of claim 16 further comprising instructions to:
calculate whether the cash involved exceeds a maximum amount, and result in issuance of the second exchange-traded fund shares along with the prescribed number of first exchange-traded fund shares.

19. A method for administrating a first exchange-traded fund, the method executed on a computer system, the method comprising:
recording by the computer system, delivery from a participant to an agent of a creation unit basket of securities for the first exchange-traded fund in exchange for a prescribed number of shares in the first exchange-traded fund, the shares for the first exchange-traded fund trading in a first country and the first exchange-traded fund having a basis that is substantially the same basis as a creation unit basis for a second exchange-traded fund traded in a second, different country;
determining by the computer system a number of shares in the second exchange-traded fund to deliver to the participant to account for cash that is owed by the agent to the participant the agent delivering the second number of shares in the second exchange-traded fund in lieu of the cash; and
recording by the computer system the prescribed number of shares in the first exchange-traded fund and the number of shares in the second exchange-traded fund to account for the cash.

20. The method of claim 19 further comprising:
calculating the amount of cash needed to be exchanged between the agent and the participant to have shares in the first exchange-traded fund equate to shares in the second exchange-traded fund at the net asset value at the close of trading of the second exchange-traded fund in the second country;
wherein if the cash needed to be exchanged is owed by the agent to the participant that cash is settled in the second number of shares in the second fund.

21. The method of claim 19 wherein the amount of cash exchanged from the agent to the market participant or from market participant to the agent equates the value of the first exchange-traded fund to the value of the second exchange-traded fund.

22. The method of claim 19 further comprising:
calculating whether the cash exceeds a maximum amount to result in issuance of the second exchange-traded fund shares along with the prescribed number of first exchange-traded fund shares.

* * * * *